United States Patent
Veverka et al.

(10) Patent No.: US 9,626,838 B2
(45) Date of Patent: Apr. 18, 2017

(54) LOAD BALANCING LOTTERY SYSTEM

(71) Applicant: TMS Global Services Pty Ltd, Toowong QLD (AU)

(72) Inventors: Mike Veverka, Milton (AU); Andrew Whatson, Toowong (AU); Xavier Bergade, Toowong (AU)

(73) Assignee: TMS Global Services Pty Ltd, Toowong Qld (AU)

( * ) Notice: Subject to any disclaimer, the term of this patent is extended or adjusted under 35 U.S.C. 154(b) by 111 days.

(21) Appl. No.: 14/358,958

(22) PCT Filed: Nov. 16, 2012

(86) PCT No.: PCT/AU2012/001426
§ 371 (c)(1),
(2) Date: May 16, 2014

(87) PCT Pub. No.: WO2013/071368
PCT Pub. Date: May 23, 2013

(65) Prior Publication Data
US 2014/0302907 A1  Oct. 9, 2014

(30) Foreign Application Priority Data
Nov. 18, 2011  (AU) ............................... 2011904828

(51) Int. Cl.
G06Q 30/00 (2012.01)
G07F 17/32 (2006.01)
G06Q 50/34 (2012.01)
H04L 29/06 (2006.01)

(52) U.S. Cl.
CPC .......... G07F 17/329 (2013.01); G06Q 50/34 (2013.01); G07F 17/3223 (2013.01); H04L 2029/06054 (2013.01)

(58) Field of Classification Search
None
See application file for complete search history.

(56) References Cited

U.S. PATENT DOCUMENTS

| | | | |
|---|---|---|---|
| 7,003,575 B2 | 2/2006 | Ikonen | |
| 7,231,445 B1* | 6/2007 | Aweya | ................ G06Q 10/00 709/219 |
| 7,677,453 B2 | 3/2010 | Chau | |
| 2003/0074453 A1* | 4/2003 | Ikonen | ................ H04L 29/06 709/228 |
| 2004/0054623 A1* | 3/2004 | Collins | ............... G09B 21/003 705/39 |
| 2006/0073897 A1* | 4/2006 | Englman | ............... G07F 17/32 463/42 |
| 2006/0122910 A1* | 6/2006 | Chau | ..................... G06Q 20/04 705/26.43 |

(Continued)

Primary Examiner — Jason Yen
(74) Attorney, Agent, or Firm — Hickman Palermo Becker Bingham LLP

(57) ABSTRACT

The present invention relates to a lottery system for redirecting an online lottery client to impede crashing owing to increased traffic during a lottery jackpot. The system includes node servers including a first node server and a second node server. A broker server indicates to the first node server that the second node server is allocated to the client so that the first node server can redirect the client to the second node server to distribute traffic among node servers and impede crashing.

20 Claims, 3 Drawing Sheets

(56) References Cited

U.S. PATENT DOCUMENTS

| | | | |
|---|---|---|---|
| 2007/0174440 A1* | 7/2007 | Brier, Jr. | G06F 17/30864 709/223 |
| 2009/0193428 A1* | 7/2009 | Dalberg | H04L 67/1002 718/105 |
| 2011/0110224 A1* | 5/2011 | Nakash | H04L 45/00 370/221 |
| 2013/0093776 A1* | 4/2013 | Chakraborty | G06F 9/505 345/520 |

* cited by examiner

LOAD BALANCING LOTTERY SYSTEM

PRIORITY

This application is a national stage application under 35 U.S. C. §371 of International Application No. PCT/AU2012/001426, filed Nov. 16, 2012, which claims the benefit of Australian Application No. 2011904828, filed Nov. 18, 2011, the disclosures of which are hereby incorporated by reference as if fully set forth herein.

TECHNICAL FIELD

The present invention generally relates to lottery systems.

BACKGROUND

The reference to any prior art in this, specification is not, and should not be taken as an acknowledgement or any form of suggestion that the prior art forms part of the common general knowledge.

Lottery is a form of gaming which involves the drawing of numbers for a prize pool.

In recent times, lottery tickets can be purchased online and over the Internet by clients. A known lottery system for enabling the online purchase of lottery tickets is disclosed in AU 2007221934. The system includes a number of clients connected to an agent server via the Internet. The agent server, in turn, can purchase lottery tickets for the clients from a state lottery administrator.

In the event that a winner is not identified for successive lottery draws, the prize pool of the lottery jackpots. In turn, there is increased demand for buying lottery tickets for larger jackpots. The increased online traffic when large numbers of clients attempt to concurrently purchase tickets through the agent server can cause the agent server to crash, thereby preventing the purchase of lottery tickets before the lottery draw. In particular, the traffic immediately before a lottery draw spikes significantly which slows traffic, and it is imperative that ticket orders are placed before the draw to ensure the integrity of the online ordering process. Otherwise, in the event of failed ticket, purchases, players will be dissuaded from purchasing tickets online in the future.

It is an object of the present invention to provide an online lottery system resistant to crashing owing to increased traffic during a lottery jackpot.

SUMMARY OF THE INVENTION

According to one aspect of the present invention, there is provided a lottery system for redirecting an online lottery client to impede crashing owing to increased traffic during a lottery jackpot, the system including:
  node servers including a first node server and a second node server; and
  a broker server indicating to the first node server that the second node server is allocated to the client so that the first node server can redirect the client to the second node server to distribute traffic among node servers and impede crashing.

The lottery system may include an agent system for selling lottery tickets provided by a state lottery administrator over a virtual private network (VPN), the agent system including the node servers and broker server.

The agent system may further include an ordering server for placing lottery ticket orders with the state lottery administrator for the client.

The broker server, node servers and ordering server may be privately interconnected (e.g. using a VPN) so that in the event of a node crash, only a subset of the nodes are inoperable and some clients allocated to operating node servers are still able to order lottery tickets.

The agent system may further include a client administration server to facilitate reporting and management of lottery ticket sales to the client. The lottery system may further include an administration client privately connected to the client administration server to administer ticket sales.

Within a predetermined period before a lottery draw, the broker server may indicate to the first node server that the second node server having the least amount of traffic of the node servers is allocated to the client.

The second node server may be allocated to the client on the basis of the number of lottery tickets purchased over time using at least one of the node servers. The second node server may be allocated to the client on the basis of the client's account type whereby the second node server provides enhanced lottery features available to only clients with a certain account type when compared with another node server that does not provide for such enhanced features.

The broker server may be configured to check an associated database for credentials relating to the client, before databases associated with the node servers are checked.

According to another aspect of the present invention, there is provided a lottery redirection method for redirecting an online lottery client, the method including the steps of:
  a broker server receiving information from a first node server relating to the lottery client; and
  the broker server indicating to the first node server that the second node server is allocated to the client so that the first node server can redirect the client to the second node server.

Preferably, the broker server functions as an intermediary between clients and the node servers to allocate the clients among the node servers so that the possibility of node servers crashing owing to high traffic is reduced. In the event of a crash, only a subset of the nodes may be inoperable and therefore some clients allocated to operating node servers would still be able to purchase lottery tickets. Advantageously, additional nodes may be readily incorporated for improved scalability of the online lottery system.

The method may further include the step of the first node server redirecting the client to the allocated second node server.

The second node server may allocated to the client on the basis of one or more of: random distribution pattern to ensure that all node servers are at some time utilized to some extent; geographic location of the client relative to at least one of the node servers; number of clients allocated to at least one of the node servers, Historical or current processor load and memory usage of at least one of the node servers; number of lottery tickets purchased over time using at least one of the node servers, the client's account type whereby one server may provide enhanced features when compared with another server.

In a first embodiment, the method may be part of an online sign-up (subscription) procedure for the client. The information may include an allocation request relating to allocating a node server to the lottery client.

Between the steps of the broker server receiving and indicating, the method may further involve allocating, with the broker server, a second node server to the lottery client in response to the allocation request.

Prior to the step of the broker server receiving, the method may further involve the first node server receiving a sign-up request from the lottery client. Subsequent to the first node server redirecting, the method may further include the step of the second node server handling the sign-up of the client.

In a second embodiment, the method may be part of an online login procedure for a signed-up client already having associated stored login credentials. The information may include an identification request relating to identifying the second node server already allocated to the lottery client.

Prior to the step of the broker server receiving information, the method may further include the step of the first node server determining that received login credentials from the client are not stored in a first node database associated with the first node server.

Subsequent to the first node redirecting, the method may further include the step of the second node server handling login of the client.

The step of the broker server indicating may be performed responsive to the broker server matching stored login credentials associated with the second node server with received login credentials from the client.

Alternatively, between the steps of a broker server receiving and indicating, the method may involve the steps of:
the broker server not locating the received login credentials in a broker database associated with the broker server;
the broker server sending the received credentials to the second node server;
the second node server indicating to the broker server that it is allocated to the client whereby the received login credentials are stored in a second node database associated with the second node server.

The method may further include the step of the broker storing the login credentials in the broker database.

The method may further involve the steps of:
the broker server unsuccessfully attempting to locate login credentials in any node servers;
the broker server notifying the first node server of an unsuccessful login; and
the first node server notifying the client of the unsuccessful login.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
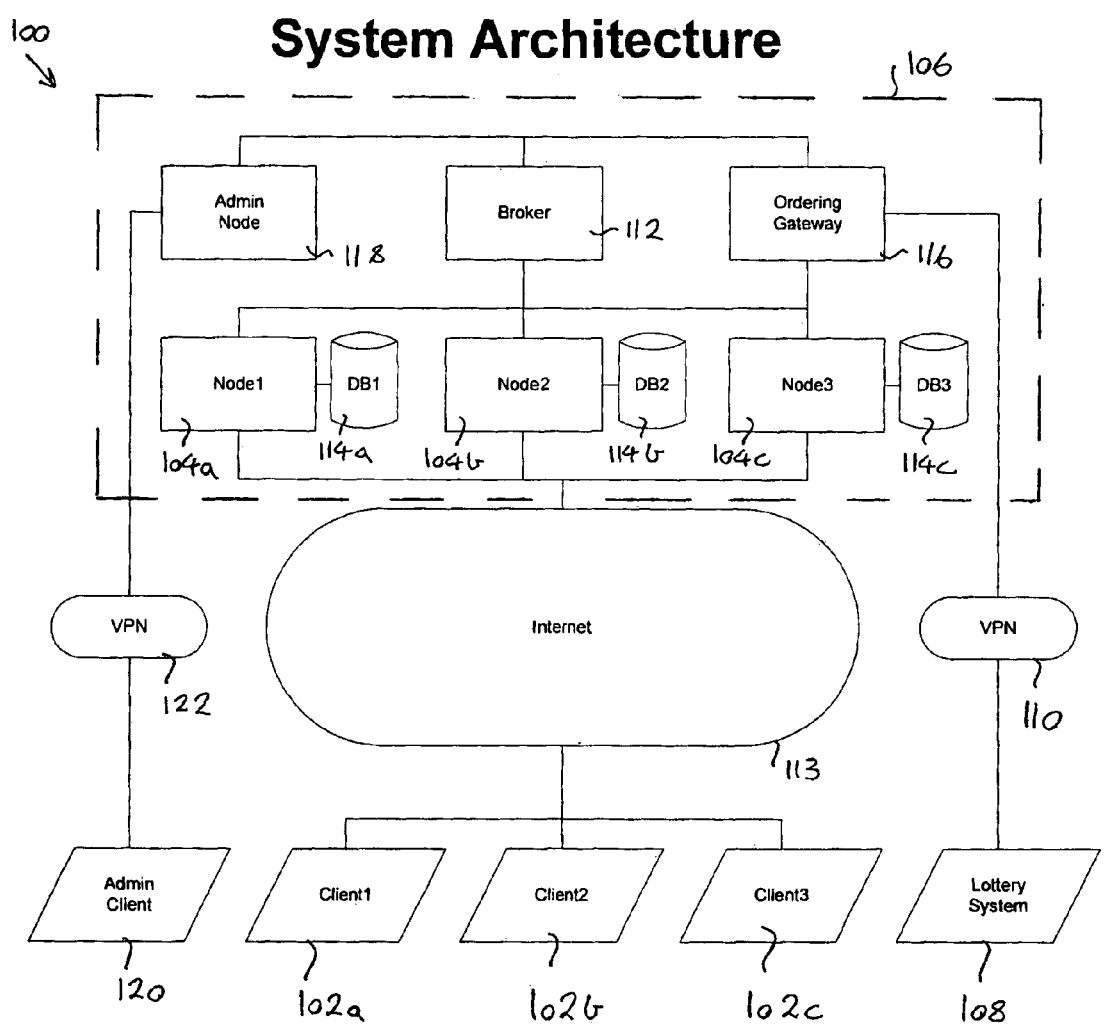
FIG. 1 is a schematic diagram of a lottery redirection system in accordance with an embodiment of the present invention.

According to an embodiment of the present invention, there is provided a redirection system 100 for redirecting an online lottery client 102a as shown in FIG. 1. The system 100 is configured to initially receive information from a first node server 104a relating to the connected lottery client 102a. The system 100 is configured to then indicate to the first node server 104a that a second node server 104b is allocated to the client 102a so that the first node server 104a can redirect the client 102a to the second node server 104b.

The redirection system 100 includes an agent system 106 for selling tickets provided by a state lottery administrator 108 over a virtual private network (VPN) 110. In turn, the agent system 106 includes a broker server 112 which functions as an intermediary between clients 102 and the node servers 104 to allocate the clients 102 among the node servers 104 so that the possibility of node servers 104 crashing owing to high online traffic is reduced. In the event of a crash, only a subset of the nodes 104 would be inoperable and therefore some clients 102a allocated to operating node servers 104 are still able to purchase lottery tickets. Advantageously, additional node servers 104 can be readily incorporated into the system 100 for improved scalability.

The clients 102 are each connected to one of the nodes 104 via the Internet 113. In contrast, the broker server 112 and node servers 104 of the agent system 106 are interconnected by a VPN, local area network (LAN), wide area network (WAN), or other like network. In practice, the node servers 104 can be located in different geographic locations with, for example, a first node server 104a being located in San Francisco and a second node server being located in Los Angeles. Each node server 104 has an associated database 114 for storing local client accounts relating to its allocated clients 102. Each client account includes login credentials (e.g. login, password, etc.) for an associated client 102. The broker server 112 has an associated internal database for global storing of all the local client accounts, with each client account being associated with an allocated node server 104 for that client 102.

The agent system 106 also includes an ordering gateway server 116 for placing lottery ticket orders with the state lottery administrator 108 for the clients 102. Furthermore, the system 100 includes a client administration node server 118 to facilitate reporting and management of lottery ticket sales to the clients 102. An administration client 120 (including agent staff) is connected to the client administration node server 118 via a VPN 122 and administers the ticket sales, reporting, etc.

Figure 2:
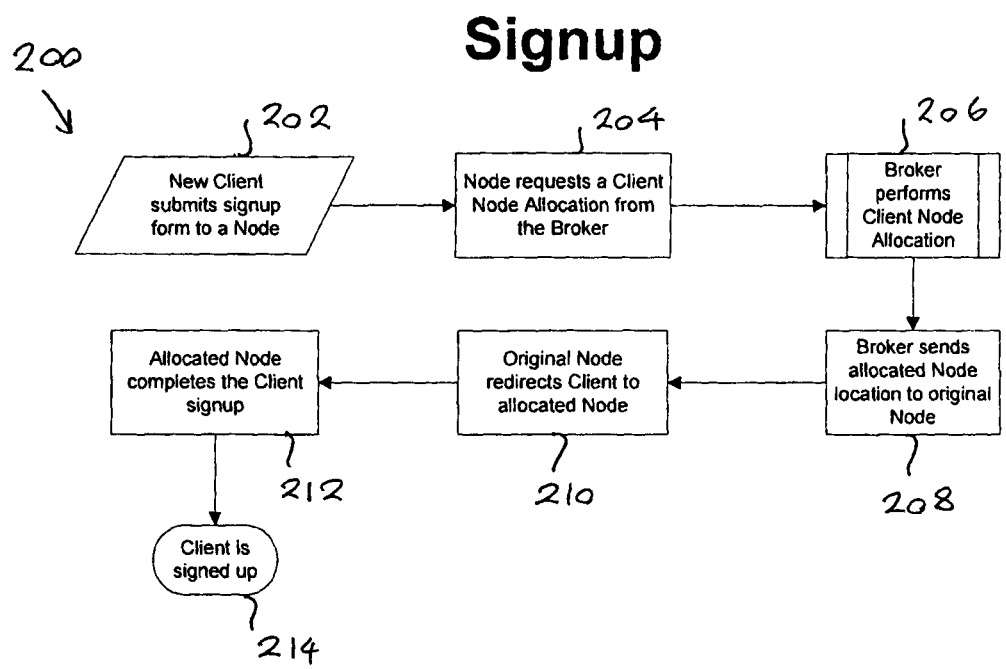
FIG. 2 is a flowchart showing a redirection method performed using the system of FIG. 1 and during client sign-up in accordance with a first embodiment of the present invention.

According to a first specific embodiment of the present invention, there is provided a redirection method 200 shown in FIG. 2 for redirecting the online lottery client 102a as part of an online sign-up (subscription) procedure for the client 102a.

As step 202, the unsigned client 102a is initially connected to a first node server 104a. The first node server 104a receives a sign-up request from the lottery client 102a when the client submits a completed online sign-up form to the first node server 104a.

At step 204, the broker server 112 receives an allocation request (i.e. information) from the first node server 104a relating to the lottery client 102a. In particular, the allocation request relates to allocating an appropriate node server 104 to the lottery client 102a.

At step 206, the broker server 112 allocates a second node server 104b to the lottery client 102a in response to the allocation request. The second node server 104b can be allocated to the client 102a on the basis of: sequential round-robin allocation among the node servers 104; one or more of a random distribution pattern which ensures that all node servers 104 are at some time utilized to some extent; geographic location of the client 102a (e.g. Pasadena) relative to at least one of the node servers 104; number of clients 102a allocated to at least one of the node servers 104, historical or current processor load and memory usage of at least one of the node servers 104; number of lottery tickets purchased over time using at least one of the node servers 104; and the client's account type whereby one node server 104a may provide enhanced lottery features (e.g. multi-draw tickets) available to only clients with a certain account type when compared with another node server 104b that does not provide for such enhanced features (rather only basic features such a single draw tickets).

At step 208, the broker server 112 indicates to the first node server 104a that the second node server 104b is allocated to the client 102a so that the first node server 104a can redirect the client 102a to the second node server 104b.

At step 210, the first node server 104a redirects the client 102a to the allocated second node server 104b.

At step 212, the allocated second node server 104b handles, to at least some extent, the sign-up of the client 102a.

At step 214, the client 102b is signed up to the second node server 104b. The second node server 104b locally stores the client account in its database 114b. The client account is also globally stored in the broker server's database where it is associated with the allocated node server 104b for that client 102a. Accordingly, allocated node server 104b will be used to handle future lottery ticket purchases or enquiries for the client 102a.

Figure 3:
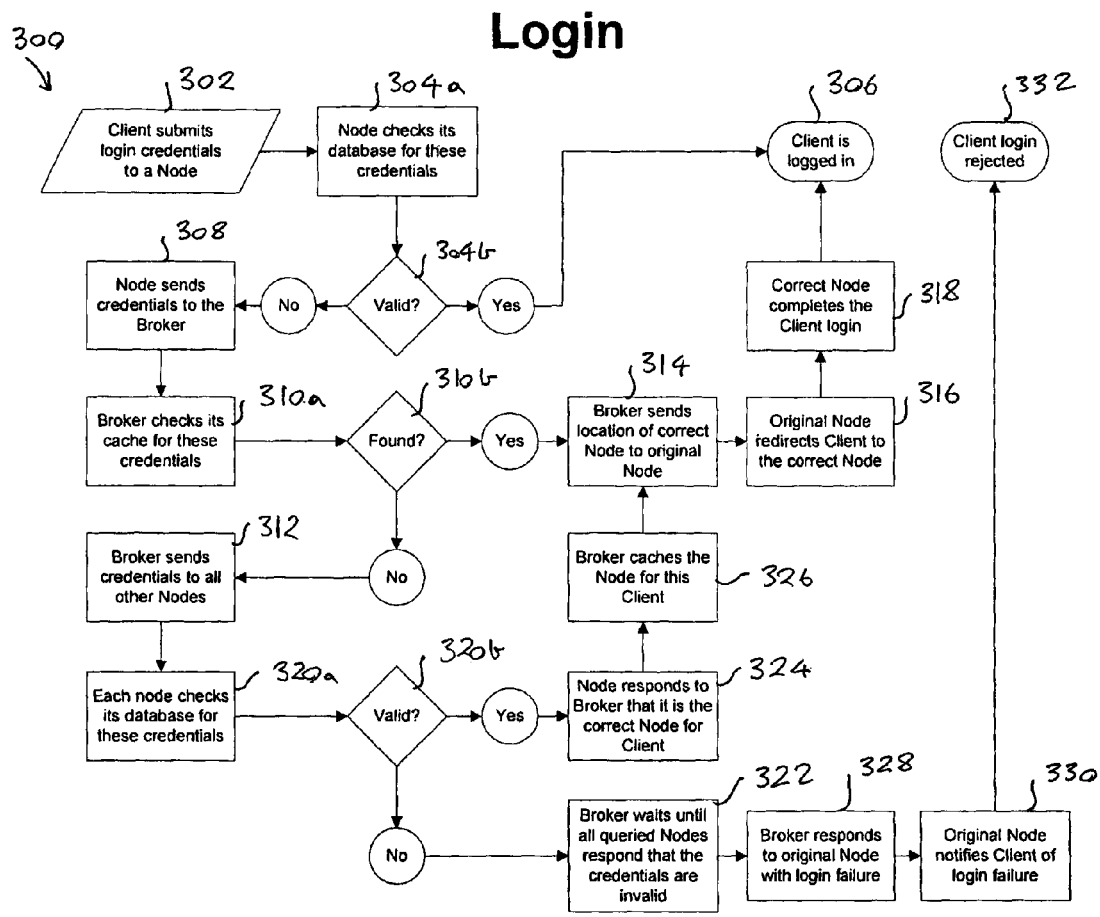
FIG. 3 is a flowchart showing a redirection method performed using the system of FIG. 1 and during client login in accordance with a second embodiment of the present invention.

According to a second specific embodiment of the present invention, there is provided a redirection method 300 shown in FIG. 3 for redirecting the signed-up lottery client 102a as part of a login procedure for the client 102a. As previously discussed, the lottery client 102a already has an associated stored client account that includes the client's login credentials.

At step 302, the client 102a is initially connected to the first node server 104a. The first node server 104a receives login credentials from the client 102a.

At step 304, the first node server 104a determines whether or not the received login credentials are stored in a client account in the first node database 114a. If the received login credentials are stored in the first node database 114a, then the client is logged in at step 306. Alternatively, if the received login credentials are not stored in the first node database 114a, then the method proceeds to step 308.

At step 308, the first node server 104a sends an identification request (i.e. information), including the received credentials, to the broker server 112. The identification request relates to identifying the second node server 104b (or other server 104c) which is already allocated to the lottery client 102a.

At step 310, the broker server 112 receives the identification request from the first node server 104a relating to the lottery client 102a. The broker server 112 determines whether or not it has stored a client account with stored login credentials matching the received login credentials. If there is no match, the method 300 proceeds to step 312 to double check whether another node server 104 is in fact allocated to the client 102a in spite of the allocation not being globally stored. If there is a match and the globally stored account is associated with the second node server 104b indicating that the client 102a is allocated to that second node server 104b, then the method 300 proceeds to step 314.

At step 314, the broker server 112 indicates to the first node server 104a that the second node server 104b is allocated to the client 102a so that the first node server 104a can redirect the client 102a to the second node server 104b.

At step 316, the first node server 104a redirects the client 102a to the allocated second node server 104b.

At step 318, the second node server 104b handles, at least in part, login of the client 102a and the client 102a is then logged in at step 306 as previously indicated.

Returning to step 312 whereby the broker server 112 previously did not locate the received login credentials stored in the broker database, the broker server 112 sends the received credentials to the second node server 104b and any other node servers 104c.

At step 320, the second node server 104b (and any other node servers 104c) determines whether or not there is stored in the database 114b (or database 114c) a client account with stored login credentials matching the received login credentials. If there is no match, the method 300 proceeds to step 322 to reject the login. If there is a match and the locally stored account is associated with the second node server 104b indicating that the client 102a is allocated to that second node server 104b, then the method 300 proceeds to step 324.

At step 324, the second node server 104b indicates to the broker server 112 that it is allocated to the client 102a.

At step 326, the broker server 112 globally stores the client account, including the login credentials, in the broker database prior to indicating to the first node server 104a that the second node server 104b is allocated to the client 102a at step 314 as previously discussed.

Returning to step 322 whereby previously the received login credentials were not stored in the second node server database 114b (or any other database 114c), the broker server 112 has unsuccessfully attempted to locate the received login credentials in any node servers 104 as each node server 104 responded confirming no login credential match.

At step 328, the broker server 114 notifies the first node server 104a of an unsuccessful login.

At step 330, the first node server 104a notifies the connected client 102a of the unsuccessful login.

At step 332, the login is rejected by the first node server 104a.

In accordance with the foregoing, a client 102a is initially redirected to an appropriate second node server 104b upon sign-up and continues to be redirected (if necessary) to that allocated second node server 104b when later logging in to place ticket orders. The system 100 has distinct advantages in terms of handling heavy online traffic and scalability when compared with a single server handling all of the traffic which is currently known.

A person skilled in the art will appreciate that many embodiments and variations can be made without departing from the ambit of the present invention.

In one embodiment, there is no lottery agent and the redirection method is handled by the lottery administrator directly.

The preferred embodiments were described in relation to sign-up (subscription) and login procedures, although the present invention is also applicable to other online lottery procedures such as ordering lottery tickets and checking lottery tickets, for example.

In one embodiment, within a predetermined period (e.g. 1 hour) before a lottery draw, the broker server 112 may allocate clients 102 to the node server 104 having the least amount of traffic. In this manner, the broker server 112 may indicate to a first node server 104a that a second node server 104*b* is allocated to the client 102*a* because the second node server 104*b* has the least amount of traffic of the node servers 104.

In compliance with the statute, the invention has been described in language more or less specific to structural or methodical features. It is to be understood that the invention is not limited to specific features shown or described since the means herein described comprises preferred forms of putting the invention into effect.

The claims defining the invention are as follows:

1. A lottery system for redirecting an online lottery client to impede crashing owing to increased traffic during a lottery jackpot, the system including:
    node servers, comprising one or more processors and memory, including a first node server and a second node server, wherein the first node server is configured to receive a first request from the online lottery client; and
    a broker server, comprising one or more processors and memory, and configured to indicate to the first node server that the second node server is allocated to the online lottery client, so that on receipt of a subsequent request from the online lottery client at the first node server, the first node server redirects the online lottery client to the second node server to complete the subsequent request, to distribute traffic among node servers and impede crashing.

2. The lottery system of claim 1, including an agent system for selling lottery tickets provided by a state lottery administrator, the agent system including the node servers and broker server.

3. The lottery system of claim 2, wherein the agent system further includes an ordering server for placing lottery ticket orders with the state lottery administrator for the online lottery client.

4. The lottery system of claim 3, wherein the broker server, node servers and ordering server are interconnected so that in the event of a node crash, only a subset of the node servers are inoperable and a client allocated to a node server that is operable is able to order lottery tickets.

5. The lottery system of claim 3, wherein the agent system further includes a client administration server to facilitate reporting and management of lottery ticket sales to the online lottery client.

6. The lottery system of claim 5, further including an administration client connected to the client administration server to administer ticket sales.

7. The lottery system of claim 1 wherein, within a predetermined period before a lottery draw, the second node server is allocated to the online lottery client because the second node server has the least amount of traffic of the node servers.

8. The lottery system of claim 1, wherein the second node server is allocated to the client according to a number of lottery tickets purchased by the online lottery client.

9. The lottery system of claim 1, wherein the second node server is allocated to the online lottery client on the basis of the online lottery client's account type whereby the second node server provides enhanced lottery features available to clients with a certain account type only.

10. The lottery system of claim 1, wherein the broker server is configured to check an associated database for credentials relating to the online lottery client, before databases associated with the node servers are checked.

11. A lottery redirection method for redirecting an online lottery client, the method comprising: receiving, at a first node server, a first request from the online lottery client;
    indicating, by a broker server, comprising one or more processors and memory, to a first node server that a second node server is allocated to the online lottery client so that the first node server can redirect the online lottery client to the second node server; and
    subsequently receiving, at the first node server, a second request from the online lottery client; and in response to the second request, and the indication by the broker server, redirecting the online lottery client to the second node server.

12. The method of claim 11, further comprising: placing lottery ticket orders for the online lottery client over a private connection with the state lottery administrator.

13. The method of claim 12, wherein in the event of a node crash, only a subset of the node servers are inoperable and a client allocated to a node server that is operable is able to order lottery tickets.

14. The method of claim 11, further comprising: reporting and lottery ticket sales to the online lottery client.

15. The method of claim 11 further comprising: within a predetermined period before a lottery draw, allocating the second node server is to the online lottery client because the second node server has the least amount of traffic of the node servers.

16. The method of claim 11, further comprising: allocating the second node server to the online lottery client according to a number of lottery tickets purchased by the online lottery client.

17. The method of claim 11, further comprising: allocating the second node server to the online lottery client on the basis of the online lottery client's account type whereby the second node server provides enhanced lottery features available to only clients with a certain account type when compared with another node server that does not provide for such enhanced features.

18. The method of claim 11, further comprising: checking a broker server database for credentials relating to the online lottery client, before checking node servers databases.

19. The method of claim 11 wherein, prior to the broker server indicating, the method further comprising: the broker server receiving an indication from the first node server that the online lottery client is connected to the first node server.

20. The method of claim 19 wherein, between the broker server receiving and indicating, the method comprising: the broker server not locating received login credentials from the online lottery client in a broker database associated with the broker server; the broker server sending the received credentials to the second node server; and the second node server indicating to the broker server that it is allocated to the online lottery client because the received login credentials are stored in a second node database associated with the second node server.

* * * * *